United States Patent [19]
Risley

[11] Patent Number: 5,924,549
[45] Date of Patent: Jul. 20, 1999

[54] CONTAINER TURNING DEVICE

[75] Inventor: Robert F. Risley, Ellicott City, Md.

[73] Assignee: Materials Handling Systems, Inc., Elkridge, Md.

[21] Appl. No.: 09/012,897

[22] Filed: Jan. 23, 1998

[51] Int. Cl.$^6$ .............................. B65G 47/24; B65G 15/02
[52] U.S. Cl. ............................................. 198/416; 198/831
[58] Field of Search ..................................... 198/416, 831

[56] References Cited

U.S. PATENT DOCUMENTS

| | | | |
|---|---|---|---|
| 2,120,315 | 6/1938 | Spellacy et al. | 198/411 |
| 2,586,523 | 2/1952 | Dudley | 198/416 |
| 2,664,816 | 1/1954 | Gibson | 198/416 |
| 3,269,513 | 8/1966 | Del Rosso | 198/416 |
| 3,420,354 | 1/1969 | Gardiner | 198/416 |
| 4,927,133 | 5/1990 | Evans | 271/225 |
| 5,439,098 | 8/1995 | Bonnet | 198/831 |
| 5,673,782 | 10/1997 | Wheeler et al. | 198/416 |

*Primary Examiner*—Joseph E. Valenza
*Assistant Examiner*—Joe Dillon, Jr.
*Attorney, Agent, or Firm*—Thomas, Kayden, Horstemeyer & Risley

[57] ABSTRACT

A container turning device comprising a conveyor section equipped with a turning ramp. The conveyor section is typically curved and powered by drive means including a drive motor, drive chains, and an internal drive conveyor. Wrapped about the drive conveyor is a frusto-conical conveyor belt that is preferably smooth-surfaced and composed of vulcanized rubber. The container turning ramp is substantially thin and is mounted to the curved conveyor section along an inner side of the section adjacent its entrance end. In a preferred arrangement, the turning ramp is provided with a substantially circular stop bumper that is rotatably mounted to the turning ramp adjacent its rear edge. The ramp is secured to the conveyor section such that the front edge of the turning ramp is positioned adjacent the entrance end of the conveyor section and just below the surface of the conveyor belt. In operation, a container traveling in a lengthwise configuration will engage both the conveyor belt and the turning ramp simultaneously. As the container continues its forward travel, an inner side portion of the container is urged upwardly along the ramp, lifting the container above the conveyor belt surface such that only a rear portion of the container remains in contact with the conveyor belt. As the container climbs the ramp, it rotates due to the difference in friction it experiences with the ramp and belt. Eventually a ninety degree turn is completed by the container and drops-off of the turning ramp and onto the conveyor belt in a widthwise orientation.

22 Claims, 4 Drawing Sheets

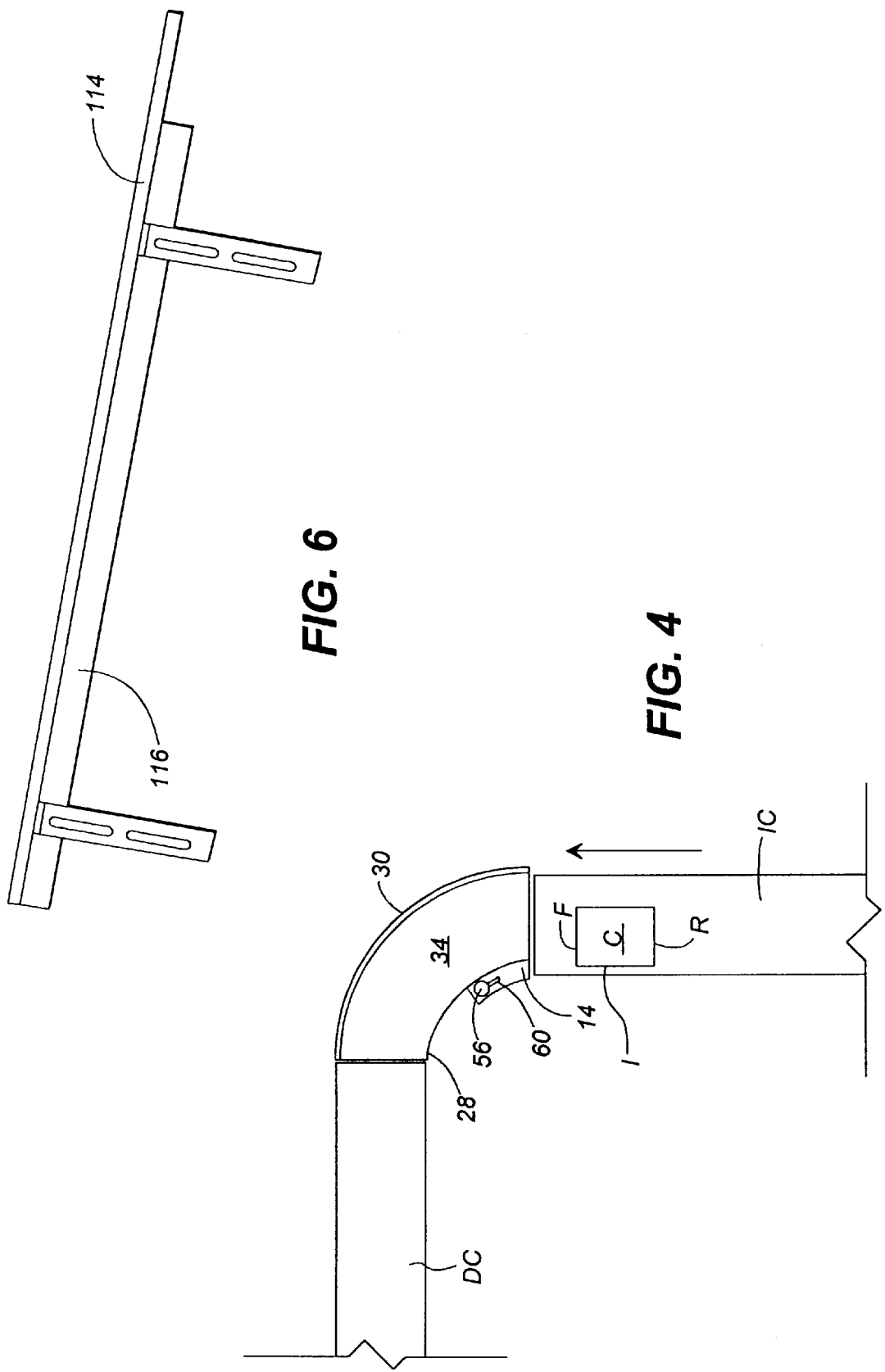

CONTAINER TURNING DEVICE

FIELD OF THE INVENTION

The invention relates generally to a device for turning containers. More particularly, the invention relates to a carton or case turning device, for use in conveyor systems, which is capable of rotating the carton or case through ninety degrees to reorient it on the conveyor in preparation for subsequent processing.

BACKGROUND OF THE INVENTION

In the food industry, systems of conveyors are used to transport goods containers from machine to machine to process them before they are shipped to distributors. Often, machinery is needed to reorient the containers as they are conveyed to and from the various processing machines to properly arrange them for upcoming machines. For instance, in the beverage industry, cases of beverage cans or bottles are typically conveyed from machine to machine in a lengthwise orientation, i.e., with the length dimension of the case parallel to its direction of travel along the conveyor. At times, however, the cases must be rotated ninety degrees such that the lengths of the cases are perpendicular to the direction of travel. For example, with some shrink-wrap machines, widthwise orientation permits greater productivity by increasing the number of cases that can be wrapped in a given period of time.

Several different turning methods have been used in the past to effect such ninety degree rotation of containers. Under one such method, the container is transported to a straight section of conveyor having two parallel conveyor belts separated by an elongated intermediate steel plate. The conveyor section is sized and configured such that each of the outer portions of the container rests upon one of the conveyor belts. In operation, the two conveyor belts are operated at different speeds to transport the container along the conveyor section. However, since the two belts are running at different speeds, the outer portion of the container that is resting upon the faster conveyor belt is pulled ahead of the opposite outer portion, causing the box to rotate about its centeral axis.

To function properly, the length of the conveyor section, speed of the two conveyor belts, and weight of the container must be taken into account to ensure that after the container has traversed the full length of the conveyor section, it will have been rotated ninety degrees. Although capable of functioning adequately under optimal operating conditions, double belt turning conveyors such as that described above tend to malfunction when such conditions are less than ideal. In particular, variations in temperature, humidity, container weight, and container material can each individually vary the frictional forces acting on the containers, causing them to be improperly rotated.

When improper rotation occurs, the common result is a conveyor jam. In that the production line must be halted with each such jam, these conveyor jams reduce productivity, delay production, and increase operation costs. Exacerbating these negative effects is the fact that once the jam is cleared, the cause of the jam must be determined and remedied to prevent new jams, further increasing production line downtime and increasing costs. In addition to creating these problems, double belt turning conveyors are long (typically about 12 feet in length) and therefore require substantial plant space that could be used for other purposes. This space requirement can create difficulty in situations in which such space is limited or unavailable.

In another common turning device, a pinwheel-shaped gate device is used to rotate containers. With such an arrangement, the gate device has a body portion through which its central axis is located. Extending outwardly in four directions, each separated by ninety degrees from the next, are gate arms. In use, a container engages the gate arm that extends across the path of the conveyor belt upon which the container rests. A photo eye senses the arrival of the container and signals a brake, which holds the gate device in position, to release causing the gate device to rotate about its central axis under the urging of the moving container. As the gate device turns, it acts as a turn/stile and causes the container to likewise rotate about the central axis of the gate device. After the container has rotated ninety degrees, and is therefore reoriented on the conveyor, the photo eye senses that the container has passed and sends a signal for the brake of the gate device to re-engage in preparation for the next container.

Gate devices of the type described above have been successfully operated in prior art systems. However, the design of these devices is complicated by moving parts and expensive electronic sensing and control devices. Accordingly, these gate devices are more expensive to purchase, operate, and maintain. Moreover, to avoid jamming of the gate device, the containers cannot be rotated quickly, thereby reducing productivity.

From this discussion it can be appreciated that it would be desirable to have a device for turning containers through ninety degrees which is both simple and inexpensive. Additionally, it would be desirable to have such a device which operates quickly and in small spaces such that high efficiency in both production and plant space optimization are maintained.

SUMMARY OF THE INVENTION

The present invention comprises a container turning device of simple design which efficiently and quickly rotates containers through ninety degrees for subsequent processing. In a first embodiment, the container turning device comprises a conveyor section equipped with a turning ramp. The conveyor section is typically curved and powered by drive means that comprise a drive motor, drive chains, and an internal drive conveyor that is operably connected to the drive chains.

Wrapped about the drive conveyor is a conveyor belt that is positioned intermediate inner and outer sides of the conveyor section. Like the conveyor section, the conveyor belt has an inner side and an outer side. In embodiments in which the conveyor section is curved, the conveyor belt will be frusto-conical and similarly follow a curved path along the conveyor section. Preferably, the conveyor belt is smooth-surfaced and composed of a resilient material such as rubber. Configured in this manner, the conveyor section can be operated to transport an object such as a container from an entrance end of the conveyor section to an exit end of the section.

The container turning ramp is mounted to the curved conveyor section along its inner side adjacent its entrance end. The turning ramp comprises a lower or front edge, an upper or rear edge, an inner edge, and an outer edge. In a preferred configuration, the ramp is substantially thin and flat and therefore can be formed from plate material. In a preferred arrangement, the turning ramp is provided with a substantially circular stop bumper that is rotatably mounted to the turning ramp adjacent its rear edge.

Mounting of the turning ramp to the conveyor section is typically achieved with mounting brackets that are connected to the underside of the ramp. Each of these brackets is provided with elongated mounting slots through which fasteners can be inserted. Because of the length of the slots, the position of the mounting brackets, and therefore the turning ramp, relative to the conveyor section can be fixedly adjusted as desired. Under normal operating conditions, the ramp will be secured to the conveyor section such that the front edge of the turning ramp is positioned adjacent the entrance end of the conveyor section and just below the surface of the conveyor belt. In situations in which the conveyor section is curved, the outer edge of the turning ramp generally follows the curve of the inner side of the conveyor section.

In operation, a container traveling in a lengthwise orientation on an infeed conveyor will be arranged slightly off-center with respect to the conveyor belt of the conveyor section such that an inner side portion of the container will be aligned with the turning ramp. Once the container reaches the entrance end of the conveyor section, the container engages both the conveyor belt and the turning ramp simultaneously. As the container continues its forward travel, the inner side portion of the container is urged upwardly along the ramp, lifting the container above the conveyor belt surface such that only a rear portion of the container remains in contact with the conveyor belt. As the container continues to "climb" the ramp, it rotates, eventually completing a ninety degree turn. If the container travels substantially the entire length of the turning ramp, it will abut the stop bumper which will roll across a front side of the container and force the container to complete its turn. Upon turning through ninety degrees, the container drops-off of the turning ramp and onto the conveyor belt in a widthwise orientation. At this point, the container will continue its path to a discharge conveyor.

In a second embodiment, the turning ramp is provided with a guide flange that is formed along the outer edge of the turning ramp. This guide flange provides a broad surface against which the container can abut when traveling along the conveyor belt after having been rotated to ensure the container is not damaged by the turning ramp while traveling along the conveyor section.

Thus, it is an object of this invention to provide a container turning device of simple and inexpensive construction.

Another object of this invention is to provide a container turning device which operates quickly and efficiently to reorient the containers for subsequent processing.

A further object of this invention is to provide a container turning device which requires little space in which to operate such that plant floor space can be optimized.

Other objects, features and advantages of this invention will become apparent upon reading the following specification, when taken in conjunction with the accompanying drawings.

BRIEF DESCRIPTION OF THE DRAWINGS

FIG. 4 is a plan view of the container turning device of FIG. 1 shown together with infeed and discharge conveyors and depicting a container as it approaches the curved conveyor section.

FIG. 6 is a side view of an elongated turning ramp of a second embodiment of the container turning device.

DETAILED DESCRIPTION

Figure 1:
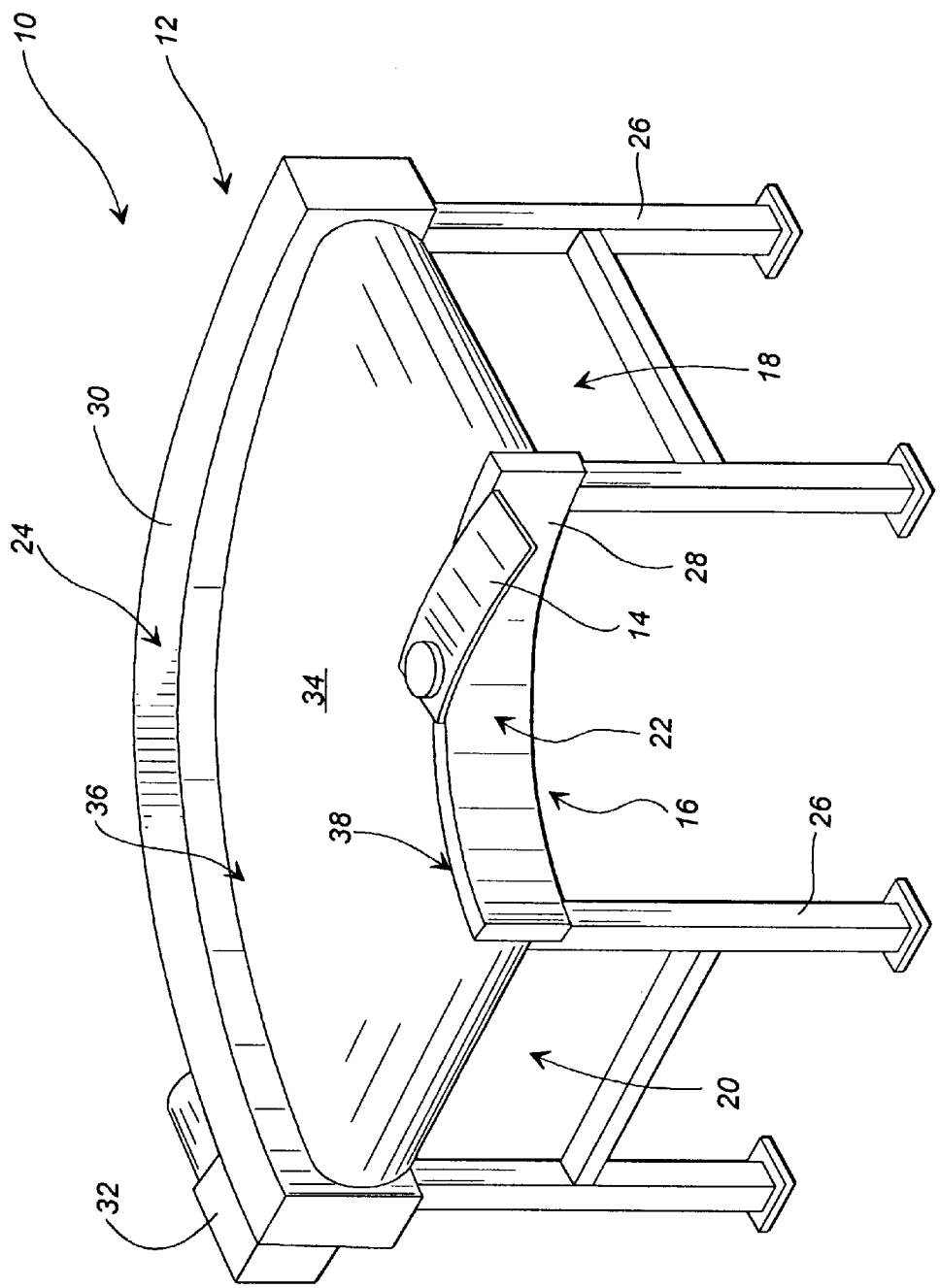
FIG. 1 is a side perspective view of a first embodiment of the container turning device of the present invention.

Referring now in more detail to the drawings, in which like numerals indicate like parts throughout the several views, FIGS. 1–5 illustrate a first embodiment of the container turning device 10 of the present invention.

As shown most clearly in FIGS. 1–4, the first embodiment of the container turning device 10 generally comprises a powered curved conveyor section 12 and a container turning ramp 14. The conveyor section is of known design and therefore will only be briefly described. Although capable of various configurations, the curved conveyor section typically comprises a body portion 16 that takes the form of an arc shaped as a quarter-circle. The body portion is defined by an entrance end 18, an exit end 20, an inner side 22, and an outer side 24. Supporting the body portion above the floor is a plurality of support legs 26. Forming the inner and outer sides, respectively, are inner and outer chain guards 28 and 30. Mounted to the outer side of the body portion is a conveyor motor 32 which is operably connected to a drive conveyor (not shown). Wrapped about the drive conveyor is a frusto-conical conveyor belt 34 that is positioned intermediate the two chain guards 28 and 30 of the conveyor section. Like the body portion, the frusto-conical conveyor belt 34 has an inner side 36 and an outer side 38. Typically, the frusto-conical conveyor belt is smooth-surfaced and is composed of a resilient material such as vulcanized rubber. One such conveyor belt deemed suitable for the present invention is currently available from Portec, Inc., however, it will be understood that the belt could take other forms and could be made of alternative materials.

When operating. the conveyor motor 32 uses drive chains (not shown) that drive the drive conveyor which in turn rotates the frusto-conical conveyor belt 34. The conveyor motor, drive chains, and drive conveyor, therefore, together comprise drive means that are used to drive the frusto-conical conveyor belt. As such, the conveyor section 12 can be operated to transport an object such as a container from the entrance end of the section to the exit end of the section. Although the size of the conveyor motor needed depends upon the speed at which the conveyor belt is to be driven and the weight of the containers to be transported, normally a three-quarter horsepower motor will be adequate for moving and rotating containers such as cases of beverage cans or bottles.

As illustrated in FIGS. 1–4, the container turning ramp 14 is mounted to the curved conveyor section 12 along the inner side 22 of the conveyor section, adjacent its entrance end 18. The turning ramp comprises a lower or front edge 40, an upper or rear edge 42, an inner edge 44, and an outer edge 46. In a preferred configuration, the ramp is substantially thin and flat and therefore may be formed from plate material. Although capable of alternative construction, the turning ramp is typically composed of a corrosion resistant metal such as stainless steel. Most preferably, the ramp is constructed from 12 gauge stainless steel. Persons having ordinary skill in the art will, however, appreciate that alternative suitable materials could be used to form the ramp including plastics, wood, glass, and the like.

Figure 3:
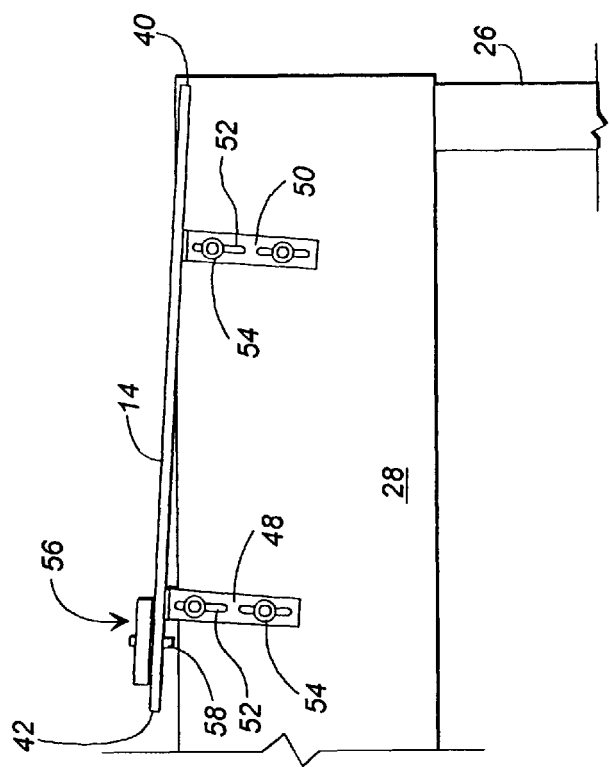
FIG. 3 is a partial side view of the container turning device shown in FIG. 1.
Figure 2:
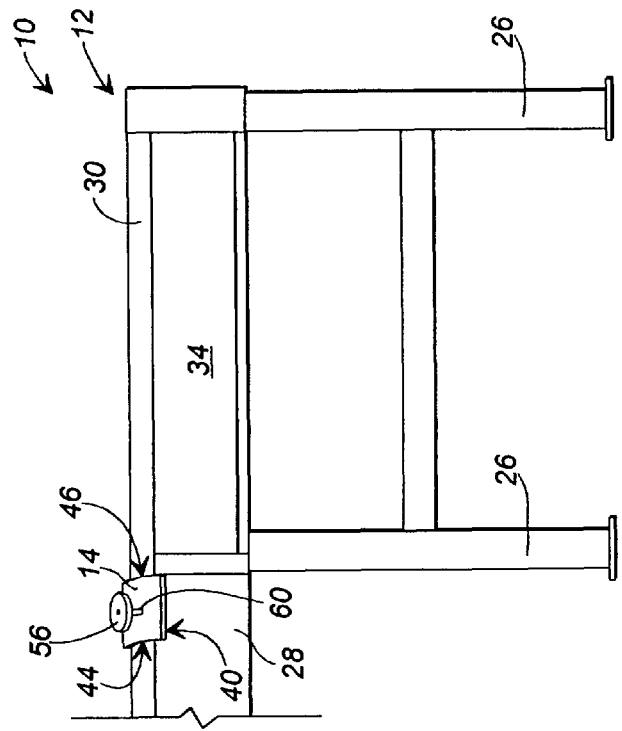
FIG. 2 is a partial front view of the container turning device shown in FIG. 1.

Illustrated in FIG. 3 are mounting brackets 48 and 50 that are connected to the underside of the ramp 14. Preferably, each of the brackets is substantially L-shaped and welded to the ramp, although it will be understood that other conventional means of fastening could be used. Each of these brackets is provided with elongated mounting slots 52 through which bolt fasteners 54 can be inserted. During installation of the ramp, the fasteners are inserted through the slots and into mounting holes provided in the inner side of the conveyor section (not shown). Because of the length of these slots, the position of the mounting brackets, and therefore the turning ramp, relative to the conveyor section can be adjusted, the purpose for such adjustment to be described below. Accordingly, the elongated mounting slots and fasteners comprise adjustment means for the turning ramp. Under normal operating conditions, the fasteners will be secured in positions along the slots such that the front edge 40 of the turning ramp is positioned adjacent the entrance end 18 of the conveyor 12 section and just below the surface of the frusto-conical conveyor belt 34. Typically, the front edge will be positioned approximately one-eighth of an inch below the belt surface. When correctly mounted, the rear edge 42 of the ramp will be positioned a predetermined height above the surface of the frusto-conical conveyor belt such that the ramp is inclined from its front edge to its rear edge. As illustrated in FIG. 4, the outer edge 46 of the turning ramp 14 generally follows the curve of the inner side 22 of the conveyor section 12. Being aligned with the inner side of the conveyor section, the outer edge 46 of the turning ramp is also adjacent the inner side 36 of the frusto-conical conveyor belt 34.

Positioned near the rear edge 42 of the turning ramp 14 is a substantially circular stop bumper 56. The stop bumper is rotatably mounted to the turning ramp with a bolt fastener 58 that passes through the central axis of the bumper and through an elongated mounting slot 60 provided in the turning ramp (FIG. 4). Due to the length of this slot 60, the stop bumper 56 can be fixed in any one of multiple axial positions along the elongated turning ramp adjacent its rear edge.

In operation, a container C to be turned approaches the container turning device 10 along an infeed conveyor IC as depicted by the directional arrows of FIG. 4. As shown in this figure, the container is oriented in the lengthwise orientation on the infeed conveyor and is arranged slightly off-center with respect to the frusto-conical conveyor belt 34. Typically, the container is positioned on the infeed conveyor such that it extends approximately two inches beyond the extent of the inner side 36 of the frusto-conical conveyor belt 34. Arranged in this manner, a side portion S of the container will be in alignment with the elongated turning ramp 14.

Figure 5:
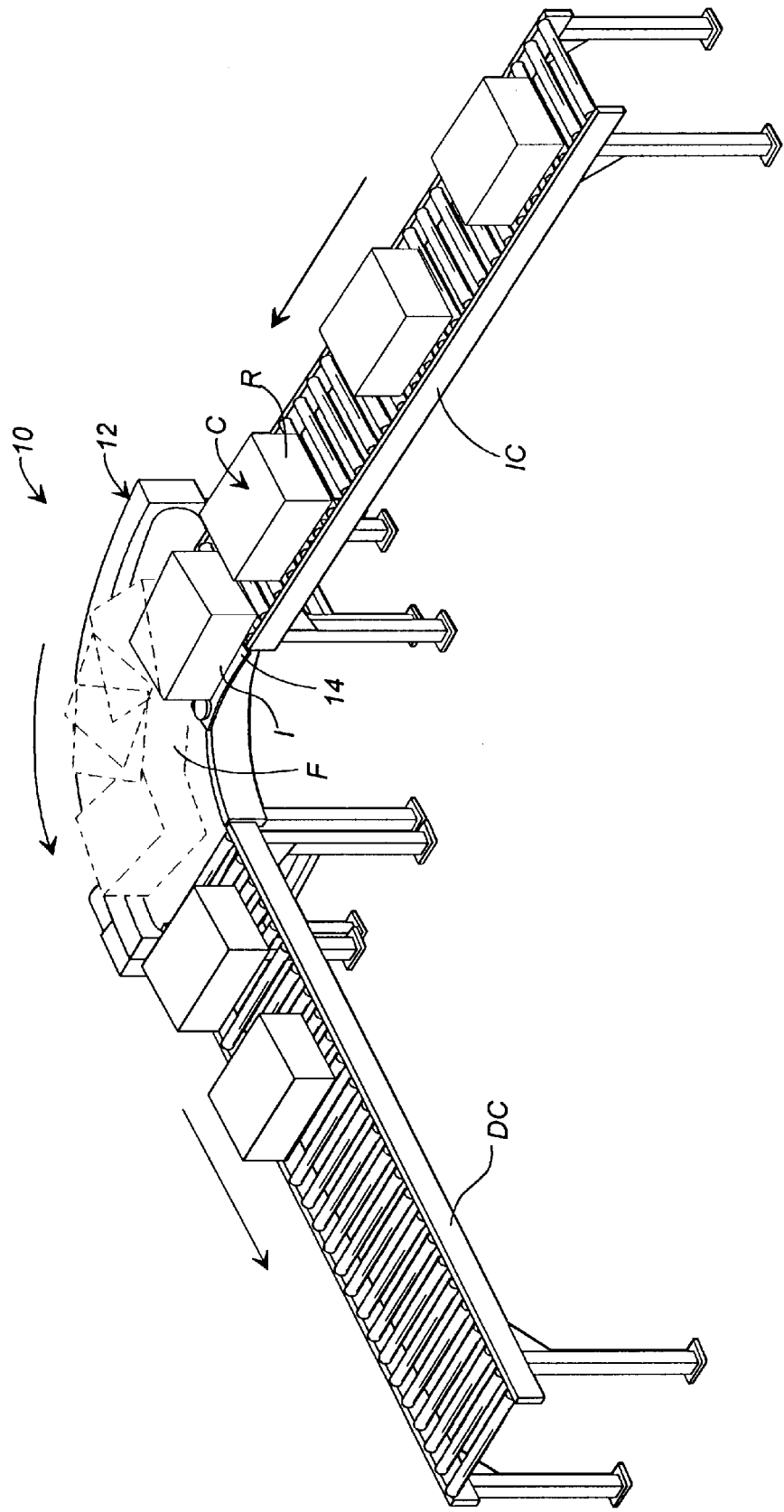
FIG. 5 is a side perspective view of the container turning device of FIG. 1 shown together with infeed and discharge conveyors and depicting rotation of a container as it traverses the container turning device from right to left.

As depicted by FIG. 5, once the container reaches the entrance end 18 of the curved conveyor, the container engages both the frusto-conical conveyor belt 34 and the elongated turning ramp 14 simultaneously. As the infeed conveyor continues to drive the container, and the frusto-conical conveyor belt begins to pull the container forward, the inner side portion of the container is urged upwardly along the ramp, lifting the container above the conveyor belt surface such that only a rear portion R of the container remains in contact with the frusto-conical conveyor belt. As the frusto-conical conveyor belt continues to drive the rear of the container forward and the container continues to "climb" the ramp, the container rotates counter-clockwise due to the difference in friction it experiences with the ramp and belt. If the preferred materials described above are used for the construction of the ramp and belt, the coefficient of friction between the container and the belt typically will be approximately 0.3 to 0.4 as opposed to a coefficient of approximately 0.1 to 0.2 between the container and the ramp. As the container continues its traversal along the curved conveyor section, it eventually completes a turn of ninety degrees. Since the container was aligned so that only a narrow portion of its total base was supported by the ramp, upon turning through ninety degrees it automatically drops-off of the turning ramp and onto the frusto-conical conveyor belt in the widthwise orientation. At this point the container will continue its travel along the curved conveyor section to a discharge conveyor DC.

The speed at which the container will turn depends upon many factors including temperature, humidity, container weight, container materials used, and conveyor speed. Likewise, the position along the elongated turning ramp at which the turn will be completed depends upon these factors. However, these variables can be easily accounted for by adjusting the angle of incline of the ramp by altering the position of the bolt fasteners along the slots of the mounting brackets. As the angle of incline is increased, the speed at which the container will be turned is increased and the distance that will be traveled by the container along the ramp is decreased. Similarly, as the angle of incline is decreased, the speed at which the container will turn is decreased and the distance that will be traveled by the container along the ramp is increased. Accordingly, the conveyor operator may adjust the incline of the ramp to suit the particular operating parameters that are encountered.

Although it is believed that optimal functioning of the turning device is possible without the stop bumper described above, this stop bumper provides an additional measure to ensure a complete ninety degree turn is achieved for each container. When a container travels substantially the entire length of the ramp, for instance when the ramp is oriented in a relatively small angle of incline, a front side F of the container will contact the bumper 56 as shown in FIG. 5. Because the bumper is free to rotate, it will roll along the front side of the container. However, since it is axially fixed in place along the ramp, the bumper will force the container to complete its ninety degree turn and fall to the frusto-conical conveyor belt 34.

In a second embodiment shown in FIG. 6, the elongated turning ramp 114 is provided with a guide flange 116 that is formed along the outer edge of the turning ramp. Preferably, this flange is approximately one and a half inches wide and spans nearly the entire length of the elongated turning ramp 114. In use, the container turning device of the second embodiment functions similarly as the device of the first embodiment. However, the guide flange provides a broader surface against which the container may abut when traveling along the frusto-conical conveyor belt after having been rotated. The provision of this broader surface reduces the possibility of damage to the container and, therefore, reduces the possibility of container jams.

So described, the container turning device of the present invention provides a simple and inexpensive means for rotating rectangular containers through a ninety degree angle. With this simple design, such containers are quickly and efficiently turned in a very small area of space. While preferred embodiments of the invention have been disclosed in detail in the foregoing description and drawings, it will be understood by those skilled in the art that variations and modifications thereof can be made without departing from the spirit and scope of the invention as set forth in the following claims. For instance, although shown as a powered curved conveyor section, it is believed that the turning ramp of the present invention could be used to turn containers that slide down straight declined conveyors under the force of gravity.

I claim:

1. A container turning device for rotating a container through ninety degrees, said container turning device comprising:

a curved conveyor section, said curved conveyor section having an entrance end, an exit end, an inner side, and an outer side;

a frusto-conical conveyor belt having an inner side and an outer side, said conveyor belt being mounted to said curved conveyor section such that operation of said frusto-conical conveyor belt will effect transport of a container placed on said conveyor belt from the entrance end of said conveyor section to the exit end of said conveyor section;

drive means for driving said frusto-conical conveyor belt mounted to said curved conveyor section; and an elongated container turning ramp mounted to said curved conveyor section, said elongated container turning ramp being positioned adjacent the inner side of said frusto-conical conveyor belt and the entrance end of said curved conveyor section, said turning ramp extending outwardly and upwardly from said curved conveyor section;

wherein when a container is transported forward along said conveyor section by said frusto-conical conveyor belt an inner side of the container is lifted by said elongated turning ramp such that only a rear portion of the container remains in contact with said conveyor belt, and wherein further forward transport of the container results in the container being urged up said ramp and simultaneously turned until the container is rotated ninety degrees relative to said conveyor section at which point the container falls-off of said ramp and onto said conveyor belt.

2. The container turning device of claim 1, wherein said curved conveyor section forms an arc in the shape of quarter-circle such that the direction of travel of the container is changed ninety degrees after traversing said curved conveyor section.

3. The container turning device of claim 1, wherein said turning ramp is substantially flat.

4. The container turning device of claim 1, wherein said turning ramp is formed from plate material.

5. The container turning device of claim 1, wherein said container turning ramp is curved such that the outer edge of said turning ramp follows the general outline of the inner side of said curved conveyor section.

6. The container turning device of claim 1, wherein said container turning device includes adjustment means for adjusting the orientation of said container turning ramp relative to said curved conveyor section and said frusto-conical conveyor belt.

7. The container turning device of claim 6, wherein said adjustment means comprises a plurality of mounting brackets provided with elongated mounting slots.

8. The container turning device of claim 1, wherein said container turning ramp includes a substantially circular stop bumper rotatably mounted adjacent the rear edge of said turning ramp.

9. The container turning device of claim 8, wherein said stop bumper mounts to said container turning ramp with a fastener that extends through a central axis of said stop bumper and an elongated slot provided in said container turning ramp, said stop bumper being fixedly adjustable along an axial direction of said container turning ramp by changing the fixation point of said fastener along the elongated slot.

10. The container turning device of claim 1, wherein said drive means comprises a drive motor, drive chains operably connected to said drive motor, and a drive conveyor operably connected to said drive chains.

11. The container turning device of claim 1, wherein said turning ramp includes a guide flange that extends from the outer edge of said ramp.

12. A container turning device, comprising:

a curved conveyor section, said conveyor section having an entrance end, an exit end, a first side, and a second side; and an elongated container turning ramp mounted to said conveyor section, said elongated container turning ramp being positioned adjacent the first side of said conveyor section at its entrance end, said turning ramp extending outwardly and upwardly therefrom;

wherein when a container travels forward along said conveyor section a first side of the container is lifted upwardly off of said conveyor section by said elongated turning ramp such that only a rear portion of the container remains in contact with said conveyor section, and wherein further forward travel of the container results in the container climbing said ramp and simultaneously turning until the container is rotated ninety degrees with respect to said conveyor section at which point the container falls off-of said ramp and onto said conveyor section.

13. The container turning device of claim 12, wherein said conveyor section forms an arc in the shape of quarter-circle such that the direction of travel of the container is changed ninety degrees after traversing said curved conveyor section.

14. The container turning device of claim 12, wherein said container turning ramp is curved such that the outer edge of said turning ramp follows the general outline of the inner side of said conveyor section.

15. The container turning device of claim 12, further comprising a frusto-conical conveyor belt mounted to said curved conveyor section and drive means for driving said frusto-conical conveyor belt, wherein operation of said drive means will effect transport of a container placed on said conveyor belt from the entrance end of said curved conveyor section to the exit end of said curved conveyor section.

16. The container turning device of claim 12, wherein said turning ramp is substantially flat.

17. The container turning device of claim 16, wherein said turning ramp is formed from plate material.

18. The container turning device of claim 12, wherein said container turning device includes adjustment means for adjusting the orientation of said container turning ramp relative to said curved conveyor section.

19. The container turning device of claim 18, wherein said adjustment means comprises a plurality of mounting brackets provided with elongated mounting slots.

20. The container turning device of claim 12, wherein said container turning ramp includes a substantially circular stop bumper rotatably mounted adjacent the rear edge of said turning ramp.

21. The container turning device of claim 20, wherein said stop bumper mounts to said container turning ramp with a fastener that extends through a central axis of said stop bumper and an elongated slot provided in said container turning ramp, said stop bumper being fixedly adjustable along an axial direction of said container turning ramp by changing the fixation point of said fastener along the elongated slot.

22. The container turning device of claim 12, wherein said turning ramp includes a guide flange that extends from the outer edge of said ramp.

* * * * *